Nov. 14, 1933.                R. K. POTTER                1,934,879
                        FREQUENCY MEASURING SYSTEM
                         Filed June 18, 1931           3 Sheets-Sheet 1

Patented Nov. 14, 1933

1,934,879

UNITED STATES PATENT OFFICE 1,934,879

FREQUENCY MEASURING SYSTEM

Ralph K. Potter, Landing, N. J., assignor to American Telephone and Telegraph Company, a corporation of New York Application June 18, 1931. Serial No. 545,359

7 Claims. (Cl. 250—39)

This invention relates to frequency measuring systems, and particularly to one in which the unknown frequency is measured by balancing it against another frequency, which frequency is made up of a number of components each of which is susceptible of being readily measured.

In the operation of a radio signaling system in which high frequencies are used as, for example, in the transoceanic short wave systems, it is necessary to measure the frequencies employed therein, and it is desirable that such measurements should be readily made.

This invention resides in a system for measuring the high frequency signals employed either in connection with short wave signaling, or with other electrical systems.

Figure 1:
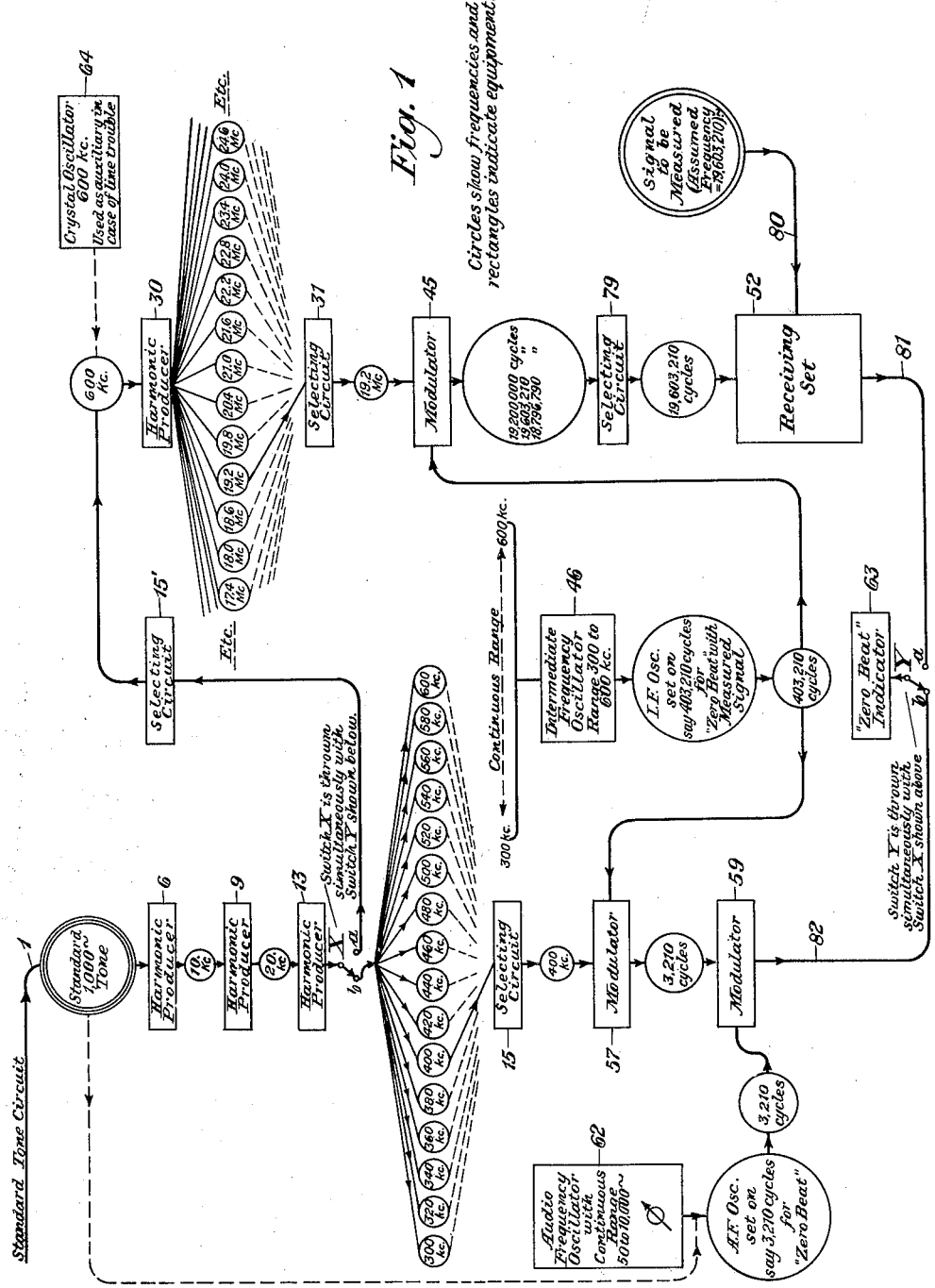
Figure 2:
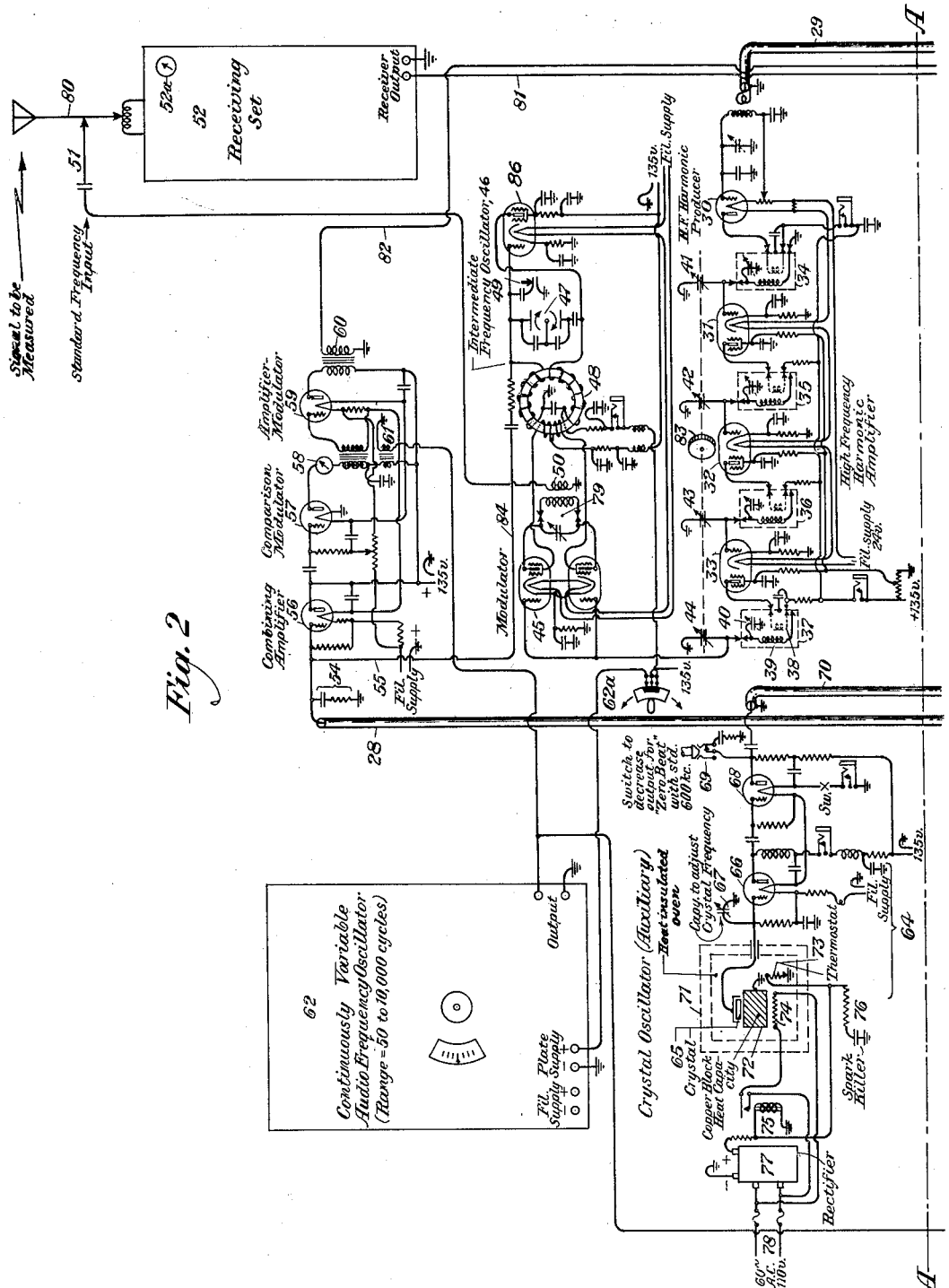
Figure 3:
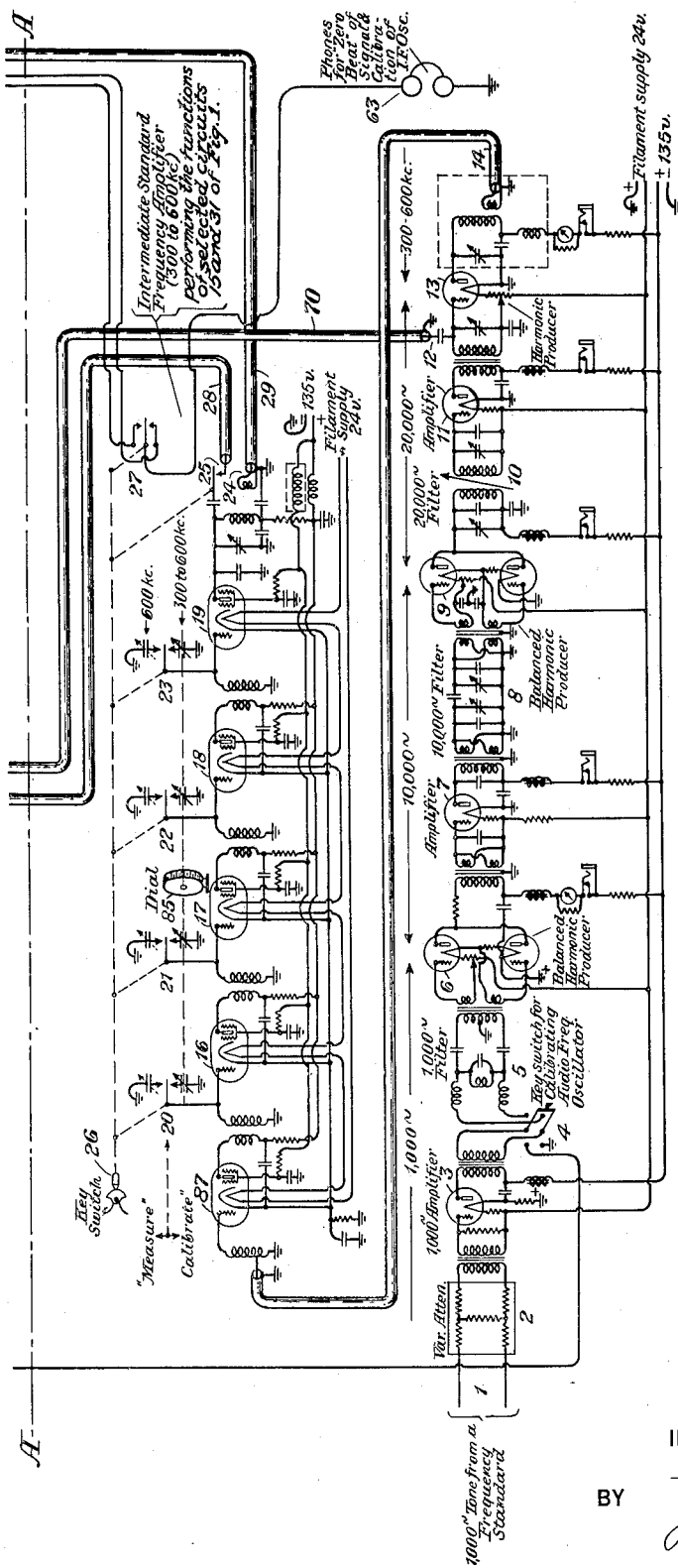

The invention will be clearly understood from the following descriptions when read in connection with the attached drawings, of which Figure 1 is a block diagram that illustrates the description of the principle of the invention, and Figs. 2 and 3, when arranged so that the lines A—A of the figures coincide, show in detail one form of embodiment of the invention.

In Fig. 1, 1 represents a very stable source of current of known frequency, for example, 1000 cycles, the said source being of such character that the percentage of error in the frequency of its current is small. Such a source is described in the paper by W. A. Marrison, entitled "A High Precision Standard of Frequency", that was published in the Proceedings of the Institute of Radio Engineers in July 1929, Vol. 17, page 1103, et seq. The 1000 cycle current is applied to a harmonic producer 6, and the harmonic of 10 kilocycles is selected and impressed upon another harmonic producer 9. That harmonic represented by 20 kilocycles produced by 9 is impressed upon the harmonic producer 13 which produces a range of harmonics extending from 300 kilocycles to 600 kilocycles, the adjacent harmonics within that range differing by 20 kilocycles. When the switch X is upon position $a$, the output of the harmonic producer 13 is connected to a selecting circuit 15' that is designed to pass that harmonic corresponding to 600 kilocycles. The harmonic thus passed will be impressed upon the harmonic producer 30 which causes the production of a range of higher harmonics of which the adjacent ones differ in value by 600 kilocycles. Although Fig. 1 shows a range of frequencies extending from 17.4 megacycles to 24.6 megacycles, it is to be understood that those figures are simply illustrative and do not in any way represent the limits of the invention. The output of the harmonic producer 30 is connected to the selecting circuit 31 which is capable of selecting any of the harmonics produced by 30, and of impressing the selected harmonic upon the input of the modulator 45. There is also connected to that modulator the output of the intermediate frequency oscillator 46 that has a range of frequencies extending from 300 to 600 kilocycles. The frequency of the oscillations produced by 46 is variable at will, but its magnitude is not known. However, it is susceptible of determination in a manner which will be described hereinafter. It is desirable to point out that the range of the oscillator 46 is one-half of the frequency difference between adjacent harmonics resulting from the producer 30. The frequencies resulting from the modulator 45 are impressed upon the selecting circuit 79, and one of the bands is impressed upon the receiving set 52 together with the unknown frequency of the incoming signal which is impressed thereon by the conductor 80. Those frequencies are beaten together in the receiving set 52 and one of the resultant frequencies is impressed by conductor 81 upon the zero beat indicator 63, assuming that the switch Y is upon position $a$. The oscillator 46 is adjusted until the indicator 63 shows no change in current indicating that the beating frequencies correspond in phase.

If the switch X is then moved to position $b$, the harmonics produced by 13 will be impressed upon the selecting circuit 15 which is capable of being adjusted at will so as to select any harmonic produced by 13. The selected harmonic is impressed upon the modulator 57 together with the frequency produced by the intermediate frequency oscillator 46. The resultant frequency is impressed upon the modulator 59 together with a frequency produced by the oscillator 62, which is an audio frequency, within the range of 50 to 10,000 cycles. It is desirable to point out that the frequency impressed upon the modulator 57 by the selecting circuit 15 is one of the harmonics between 300 kilocycles and 600 kilocycles, which range is the same as that of the intermediate frequency oscillator 46. It is important to note, however, that the oscillator 46 is capable of producing all frequencies within the range, and of impressing such frequencies upon the modulators 57 and 45; whereas the frequency that the selecting circuit 15 is capable of impressing upon the modulator 57, differs by 20 kilocycles from those adjacent to them in the frequency range. If the frequency from the selector 15 is properly chosen the result is that the output current of the modulator 57 is of audio frequency. That frequency is impressed upon the modulator 59 together with another audio frequency from the oscillator 62. The resultant frequency of 59 is impressed by conductor 82 upon the zero beat indicator 63, assuming that the switch Y is upon position b.

The method of measuring the frequency of a signal or other wave, will now be described. Let it be assumed that a signal whose frequency is unknown, is picked up by the antenna 80 and impressed upon the receiving set 52. Let it also be assumed that the source 1 of a known frequency is connected to the harmonic producer 6. The harmonic corresponding to 10 kilocycles is impressed upon the harmonic producer 9, and that harmonic corresponding to 20 kilocycles is selected and impressed upon the producer 13. Now, assuming that switch X is upon position a, the harmonics produced by 13 will be impressed upon the selecting circuit 15' and that harmonic corresponding to 600 kilocycles will be selected and impressed upon the harmonic producer 30. One of the harmonics produced by 30 may be selected by adjusting the selecting circuit 31, and impressed upon the modulator 45. The harmonic selected by 31 will depend upon the magnitude of the unknown frequency, it being desirable, of course, to select that harmonic which is closest in the frequency spectrum to the unknown frequency. The choice depends in a measure, upon the ability of the tester to determine by the position of the dials of the receiving set 52, the approximate position in the frequency scale of the signal of unknown frequency. Let it be assumed that the unknown frequency is in the neighborhood of 19.5 megacycles. The tester should accordingly select that harmonic corresponding to 19.2 megacycles, and it would be impressed upon the modulator 45. There would also be impressed upon that modulator, current from the oscillator 46 which should be varied in frequency until the upper side-band produced by beating together the selected frequency of 19.2 megacycles and the intermediate frequency of the oscillator 46, are the same as the unknown frequency, which condition exists when the device 63 shows a zero beat indication.

That process of adjustment will perhaps be better understood if we refer to the specific figures, assumed for illustrative purpose and shown on the drawings. The frequency of the harmonic impressed by the selecting circuit 31 upon the modulator 45 is known, since the selecting circuit is calibrated and the frequencies corresponding to different settings are clearly indicated. It will accordingly be known, that in the output of the modulator there will appear the frequency 19.2 cycles and the upper and lower side bands thereof. The selecting circuit 79 is adjusted to pass only one side band, for example, the upper one. The frequency corresponding to that side band is impressed upon the receiving set 52 together with unknown frequency, and by varying at will the oscillator 46 we get, for some adjustment of the oscillator 46, a zero beat indication by the device 63. Obviously, that means that the incoming signal of unknown frequency has been balanced by a current of like frequency. One component of that frequency is known, namely, the frequency selected by the selecting circuit 31 and impressed upon the modulator 45, which in the assumed illustrative case is 19.2 megacycles. Since the selecting circuit 79 was adjusted to pass the upper side band, we know that the frequency of the incoming signal is larger than 19.2 to the extent represented by the frequency of the oscillator 46, when adjusted for zero indication.

The next step is to measure the frequency of the oscillator 46 at the point of zero beat indication. This is done in the following manner. The switches X and Y are each thrown to the position b, and the selecting circuit 15 is manipulated to impress upon the modulator 57 a succession of harmonics produced by 13. Simultaneously, there are impressed upon the modulator 57 oscillations produced by 46 whose adjustment remains at the point of zero beat indication, previously mentioned. Various frequencies will be impressed by 15 upon the modulator 57 until an audio frequency results from that beating operation, which condition will be manifested by the action of the zero beat indicator. If the latter is a telephone receiver, obviously the output of the modulator 57 would be manifested by an audible sound. One of the side bands of the modulator 57 is selected and is impressed upon the modulator 59 simultaneously, with the impression thereon of current from the audio frequency oscillator 62. The latter oscillator is varied through its range until its frequency is the same as that of the frequency impressed by the modulator 57 upon the modulator 59, which condition will be manifested by a zero beat indication. The frequency of the harmonic impressed upon the modulator 57 by the selecting circuit 15, is known by the setting of the said selecting circuit at the time when an audio frequency results in the output of the said modulator. Let it be assumed that the selected harmonic corresponds to 400 kilocycles. That gives us the second component of the unknown frequency, and the only factor to be determined is the frequency of the audio component resulting from the modulation in the device 57. The latter frequency is determined by the setting of the audio frequency oscillator 62 when a zero beat indication is given as the result of beating together the selected side band from the modulator 57 and the frequency from the device 62. In the assumed case, that frequency is 3210 cycles. By adding together the frequency of the harmonic selected by 31, viz 19.2 megacycles, the frequency of the harmonic selected by 15, viz 400 kilocycles, and the setting of the audio frequency oscillator 62 at the time of zero beat indication, viz 3210 cycles, the value of the unknown frequency, namely, 19,603,210 cycles, is obtained. Whether 3210 cycles should be added or subtracted is determined by the approximate dial setting of 15, or by slightly changing the frequency of 46, by a switch 49 shown in Fig. 2.

In the upper right-hand corner of Fig. 1, there is shown a crystal oscillator 64 having the assumed value of 600 kilocycles. That arrangement, which is shown in greater detail in Fig. 2, is intended as an auxiliary source to be used in case of trouble upon the circuit connecting the source 1 to the place where the frequency measurements are being made. In some instances that source may be located at a point quite remote from the place where the measurements are being made, and the 1000 cycle tone may be supplied by a transmission circuit. Such circuit may be noisy due to unbalance, or other faults upon the line. In order to obtain a reasonably pure harmonic at the high frequencies, for example, those produced by the harmonic producer 30, it is necessary that the line noise must be low. The auxiliary oscillator 64 is provided to furnish a pure 600 kilocycle current directly to the harmonic producer 30 when line trouble exists upon the circuit connecting the source of standard 1000 cycle tone to the place where the measurements are being made.

In order to calibrate the audio frequency source 62, a branch circuit is provided from the source of 1000 cycle tone to the output of the oscillator 62. By disconnecting the output of the modulator 57 from the modulator 59, the feeding into the latter of 1000 cycle current from the standard source 1 and also current from the oscillator 62 when adjusted to the position corresponding to 1000 cycles, and even multiples thereof, a determination of the accuracy of the oscillator may be made by observing the position of the zero beat indicator 63.

The circuits and apparatus shown symbolically in Fig. 1, are set forth in detail in Figs. 2 and 3, when those figures are arranged so that the lines A—A coincide. In those figures, as thus arranged the source 1 of the 1000 cycle tone is connected through the variable attenuator 2 to the input circuit of the 1000 cycle amplifier 3. The switch 4 when thrown to the right, connects the output circuit of the amplifier to the input of the filter 5 whose function is to prevent all frequencies, other than 1000 cycles from reaching the balanced harmonic producer 6. When the switch 4 is thrown to the left, the output of the 1000 cycle amplifier 3 is connected to the output of the audio frequency oscillator 62, for the purpose of calibrating the latter in the manner described hereinbefore. The harmonic producer 6 is intended to give a frequency of 10,000 cycles with a variation of 1000 cycles above or below that figure. The resultant currents are amplified by 7 and impressed upon the filter 8 which is designed to pass currents of the frequency of 10,000 cycles. Those currents are impressed upon the balanced harmonic producer 9 which is designed to give 20,000 cycles. Current of that frequency will be passed by the filter 10, and when amplified by 11 will be impressed upon the harmonic producer 13 which is designed to give a range of harmonics extending from 300 kilocycles to 600 kilocycles, the adjacent harmonics differing by 20 kilocycles. At the point 12 there is connected to the input of the harmonic producer 13, the shielded conductor 70, so that there may be impressed upon that input, oscillations of 600 kilocycles produced by the auxiliary oscillator 64, which is of the crystal controlled type. That oscillator will be more fully described hereinafter.

The harmonics produced by 13 are impressed upon the shielded conductor 14 and transmitted to the intermediate frequency amplifier which constitutes a selecting circuit which, depending upon the position of the switch 26, is capable of performing either the function of the selecting circuit 15 or of the selecting circuit 15', shown in Fig. 1. The selecting network comprises a plurality of amplifiers having tubes of the unipotential cathode type and also having screen grids. The grids of the tubes 16, 17, 18 and 19 are connected to the movable members 20, 21, 22 and 23 of a gang switch 26, which, when thrown upwards, connects those members to fixed condensers that will tune the amplifier to the frequency of 600 kilocycles; and, when thrown downwardly, will connect those members to a plurality of variable condensers controlled by a dial that will tune the amplifier to a definite frequency corresponding to harmonics extending from 300 to 600 kilocycles, which harmonics are spaced at intervals of 20 kilocycles. The output of tube 19 is connected by a filtering network to the shielded conductor 29 at the point 24. The output of the tube 19 is also capable of being connected to the shielded conductor 28 by the closing of the contact 25 whenever the key 26 is operated in its downward position. Likewise, the movable member of switch 27 is controlled by the switch 26 in order to connect the head phones 63 (which constitute the zero beat indicator) either to the output of the receiving set 52, or to the output of the modulator 59, depending upon the position of the switch 26. The shielded conductor 29 serves to convey the 600 kilocycle current to the input of the harmonic producer 30, the output of which extends through a wide range of high frequencies. Those harmonics are impressed upon the tubes 31, 32 and 33 comprising the high frequency harmonic amplifier. The grids of the tubes of that amplifier are connected to the variable condensers 41, 42 and 43, which may be adjusted at will, and the frequency corresponding to a particular position will be indicated by the dial 83. That dial also controls the setting of the condenser 44 connected to the tuned circuit 38—39—40. That tuned circuit is connected to the input of the modulator 45 to which is also connected the intermediate frequency oscillator 46, the connection being effected through the shielding grids of the vacuum tubes of 45. The intermediate frequency oscillator comprises the vacuum tube 86, which is of the shield grid type, and designed for a range of 300 to 600 kilocycles with great stability. The inductance coil 48, and the mechanically and electrically balanced condenser 47, constitute the tuning elements of that oscillator. A key 49 is provided to vary the frequency of the oscillator slightly during the making of a calibration, in order to render it possible to determine whether the oscillator frequency is slightly above or below a standard frequency. The currents of the intermediate frequency will beat with the selected harmonic in the modulator 45, and the resultant band selected by the tuned circuit 79 will be impressed upon the high frequency output coil 50 that serves to couple the modulator to the input of the receiving set 52. The setting of the condenser 47 of the intermediate frequency oscillator is varied until the beat current which is transmitted by conductor 81 to the phones 63 (when the switch 26 is in its upward position) does not vary.

When the switch 26 is in its downward, that is calibrating position, the output of the intermediate frequency amplifier, which, as stated, constitutes the selecting network, will be transmitted through contact 25 and over the shielded conductor 28, to the input of the combining amplifier 56. There is also connected to that amplifier the lead 84 extending from the intermediate frequency oscillator 46. Current of the frequency transmitted by the selecting network 15, will be beaten with the current from the intermediate frequency oscillator 46, and the dial 85 will be adjusted until the current that passes through the comparison modulator 57 and also through the amplifier modulator 59 will be of such frequency as to produce a readily audible tone in the phones 63. It will be seen that those phones are connected to the output of the modulator 59 through the lower contact of switch 27, conductor 82 and coupling 60. The setting of the dial 85, when such audible tone is produced, gives the value of the second component of the unknown frequency. The third and last component is obtained by means of the continuously variable audio frequency oscillator 62 which may be of any well known type having great stability throughout the range of 50 to 10,000 cycles. That oscillator has its output connected through the coil 61 to the input of the modulator 59. By varying the setting of the oscillator 62 until a zero beat indication is given by the phones 63, the value of the audible frequency impressed by the modulator 57 upon the modulator 59, may be determined.

The auxiliary oscillator 64, which is of the crystal controlled type, is shown just below the oscillator 62. It is intended to produce a testing frequency of 600 kilocycles that is very stable. Energy for heating the crystal of the oscillator is derived from a 60 cycle A. C. 110 volt power circuit. The source 78 is connected to the rectifier 77 which is connected to the thermostat 73 of the crystal assembly; and is also connected to the relay 75 which controls the application of the alternating current to the heating element 74 of the crystal assembly. The large copper block 72 provides capacity for heat to prevent excessive variations in the temperature of the crystal. The crystal 65 is connected through its mounting to the grid of the tube 66, the connection including the loading condenser 67 for a slight adjustment of frequency. All of the crystal control apparatus is mounted in the oven 71 which is insulated against the transfer of heat. The output of the oscillator 66 is connected to the amplifier 68, which in turn is connected to the shielded conductor 70 by which oscillations are transmitted to the point 12 of the input circuit of the harmonic producer 13. A switch 69 is provided to decrease the output for zero beat indication with standard 600 kilocycle current.

While the invention has been described as embodied in particular forms, it is to be understood that such showing is purely for the purpose of illustrating the invention, that the said invention is not limited other than by the scope of the appended claims.

What is claimed is:

1. In a frequency measuring system, the combination with a modulator having a beat indicating device connected therewith, of means to impress thereon a current of unknown frequency, means to impress thereon a measuring current of the same frequency as said unknown frequency to produce a zero beat indication, means for building up the said measuring current by combining a known frequency and another unknown frequency, and means to measure the magnitude of the said other unknown frequency.

2. The method of measuring an unknown frequency which consists in beating together the current of unknown frequency with another current made up of two components one of which is of known frequency and the other of unknown frequency variable at will and susceptible of determination, adjusting the frequency of the latter component until zero beat indication is given when both of said currents are beaten together, and measuring the frequency of the said other component after said adjustment has been effected.

3. The method of measuring an unknown frequency which consists in beating together the current of unknown frequency with another current that is built up by modulating two components one of known frequency and the other of unknown frequency, varying the latter component during said beating operation until zero beat indication is given, then measuring the magnitude of the component of unknown frequency.

4. The method of measuring an unknown frequency which consists in beating together the current of unknown frequency with another current that is built up by modulating two components one of known frequency and the other of unknown frequency, varying the latter component during said beating operation until zero beat indication is given, beating the component of unknown frequency with current of known frequency to produce an audio frequency resultant and then beating the said resultant with audio frequency from a calibrated source until zero beat indication is given.

5. The method of measuring an unknown frequency which consists in producing from a stable frequency a group of harmonics throughout a known range, selecting one of said harmonics and producing therefrom another group of harmonics that differ from each other by an amount equal to the entire range of said first mentioned group of harmonics, selecting one of the second group of harmonics and modulating it by oscillations whose frequency is variable at will to produce a resultant band, beating together the said unknown frequency and the said resultant band while varying the frequency of the said oscillations employed in the said modulating step until zero beat indication is shown, then measuring the frequency of the said oscillations by beating them with a determinable source of frequency until zero beat indication is shown.

6. In a frequency measuring system, the combination with a modulating device upon which may be impressed the unknown frequency to be measured, of a source of current of known frequency, means to produce harmonics of the said frequency, means to select one of the said harmonics, a second modulating device upon which the selected harmonic is impressed, an oscillator variable at will also connected to said second modulating device, means to select one of the frequencies resulting from the second modulating device and to impress it on the said first mentioned modulating device, and means to measure the frequency generated by the said oscillator when zero beat is indicated in the output of the first mentioned modulating device.

7. In a frequency measuring system, the combination with a modulating device upon which may be impressed the unknown frequency to be measured, of a source of current of known frequency, means to produce harmonics of the same frequency, means to select one of the said harmonics, a second modulating device upon which the selected harmonic is impressed, an oscillator variable at will also connected to said second modulating device, means to select one of the frequencies resulting from the second modulating device and to impress it on the said first mentioned modulating device, a third modulating device, upon which a known harmonic may be impressed together with the frequency produced by said oscillator when adjusted for the zero beat indication with the unknown frequency, a fourth modulating device upon which is impressed the output of the third modulating device, and a source of current of known frequency, variable at will, also connected to said fourth modulating device to beat the current impressed thereon by said third modulating device.

RALPH K. POTTER.